(12) United States Patent
Wong et al.

(10) Patent No.: US 8,595,349 B1
(45) Date of Patent: Nov. 26, 2013

(54) METHOD AND APPARATUS FOR PASSIVE PROCESS MONITORING

(75) Inventors: Carlos Wong, Castro Valley, CA (US); Yuh-Yen Yen, San Jose, CA (US); Bhavin Thaker, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 1735 days.

(21) Appl. No.: 11/703,416

(22) Filed: Feb. 7, 2007

(51) Int. Cl.
*G06F 15/16* (2006.01)
*G06F 3/00* (2006.01)
*G06F 12/00* (2006.01)
*G06F 11/00* (2006.01)

(52) U.S. Cl.
USPC .............. 709/224; 714/48; 714/49; 714/55; 719/318; 711/202; 711/203

(58) Field of Classification Search
USPC ............... 709/224; 714/48–55; 719/318
See application file for complete search history.

(56) References Cited

U.S. PATENT DOCUMENTS

| | | | | |
|---|---|---|---|---|
| 5,949,415 | A * | 9/1999 | Lin et al. | 715/740 |
| 6,178,529 | B1 * | 1/2001 | Short et al. | 714/51 |
| 6,457,142 | B1 * | 9/2002 | Klemm et al. | 714/38 |
| 7,000,150 | B1 * | 2/2006 | Zunino et al. | 714/38 |
| 7,086,064 | B1 * | 8/2006 | Stevens | 719/310 |
| 7,206,975 | B1 * | 4/2007 | Wilding | 714/47 |
| 7,434,206 | B2 * | 10/2008 | Seidman et al. | 717/124 |
| 2007/0074170 | A1 * | 3/2007 | Rossmann | 717/127 |
| 2007/0094532 | A1 * | 4/2007 | Sengupta et al. | 714/5 |

OTHER PUBLICATIONS mmap, 2:mmap (linux man page), Feb. 4, 2005, [online], retrieved from <web.archive.org/web/20050204065005/man-wiki.net/index.php/2:mmap>, pp. 1-6 as printed.*

Somayaji, Automated Response Using System-Call Delays, 2000, USENIX Security Symposium, [online], retrieved from <cs.unm.edu/~immsec/publications/uss-2000.pdf>, pp. 1-13 as printed.*

Kiran, Understanding the Proc File System, Nov. 23, 2004, [online], retrieved from <web.archive.org/web/20041123105130/www.geocities.com/ravikiran_uvs/articles/proc.html>, pp. 1-8 as printed.*

* cited by examiner

*Primary Examiner* — Saleh Najjar
*Assistant Examiner* — Oleg Korsak
(74) *Attorney, Agent, or Firm* — Wilmer Cutler Pickering Hale and Dorr LLP (57) ABSTRACT

Method or apparatus for passive process monitoring is described. One aspect of the invention relates to monitoring a process executing on a computer system. An operating system is instructed to report at least one event related to process termination. Termination of the process is detected in response to a reported instance of the at least one event by the operating system. A notification is provided to an agent in the computer system that the process has terminated.

19 Claims, 5 Drawing Sheets

METHOD AND APPARATUS FOR PASSIVE PROCESS MONITORING

BACKGROUND OF THE INVENTION

1. Field of the Invention

Embodiments of the invention generally relate to redundant computer systems. More specifically, this disclosure relates to a method and apparatus for passive process monitoring, such as, monitoring the termination of a process in a clustered computer system.

2. Description of the Related Art

Computer systems and their components are subject to various failures. These failures are generally related to devices, resources, applications, or the like. Many different approaches to fault-tolerant computing are known in the art. Fault tolerance is the ability of a system to continue to perform its functions, even when one or more components of the system have failed. Fault-tolerant computing is typically based on replication of components (i.e., redundancy) and ensuring for equivalent operation between the components. Fault-tolerant systems are typically implemented by replicating hardware and/or software (generally referred to as resources), such as providing pairs of servers, one primary and one secondary. Such a redundant system is often referred to as a server cluster, clustered computer system, clustered environment, or the like. A server in a clustered environment is generally referred to as a node or cluster node. The failover of resources in the clustered system is handled by clustering software that is distributed among the cluster nodes.

The clustering software typically comprises cluster agents distributed throughout the clustered system (e.g., each node may include a cluster agent). The cluster agents monitor events associated with resources in the clustered environment for the purpose of detecting failures and initiating failovers. Conventionally, the cluster agents actively poll the operating systems managing the resources, at specified intervals, e.g. every 60 seconds, for the current state of these resources. This active, periodic polling consumes additional computing resources, such as, memory and processor resources. The consumed resources are then not available for use by other applications in the system. On systems with a large number of monitored resources, the polling mechanism can consume a relatively large percentage of computing resources.

Therefore, there exists a need in the art for a method and apparatus that provides a resource monitoring system that functions passively without the need to actively poll for events related to the resources.

SUMMARY OF THE INVENTION

Method or apparatus for passive process monitoring is described. One aspect of the invention relates to monitoring a process executing on a computer system. An operating system is instructed to report at least one event related to process termination. Termination of the process is detected in response to a reported instance of the at least one event by the operating system. A notification is provided to an agent in the computer system that the process has terminated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
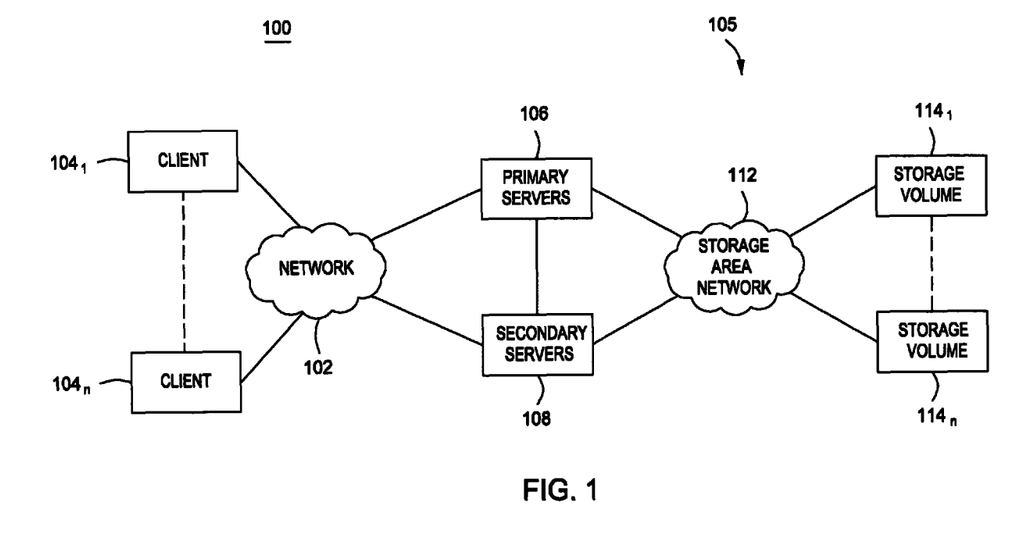
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102, clients $104_1$-$104_n$, a server cluster 105, a network 112, and storage volumes $114_1$-$114_n$. In the present example, the server cluster 105 includes primary servers 106 and secondary servers 108. By "primary" it is meant that the servers 106 nominally provide resources for use by the clients $104_1$-$104_n$. By "secondary" it is meant that the servers 108 provide redundant or failover resources for the resources of the primary servers 106. Thus, the secondary servers 108 provide resources to the clients 104 only to the extent such resources on the primary server 106 fail. The servers 106 and 108 may also be generally referred to herein as computer systems or nodes in the server cluster 105.

The clients $104_1$-$104_n$ are configured for communication with the server cluster 105 via the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. The clients $104_1$-$104_n$ may comprise various types of computers, such as laptops, desktop computers, workstations, and the like. The primary servers 106 and the secondary servers 108 provide resources for the clients $104_1$-$104_n$. For example, the primary servers 106 and secondary servers 108 may include file servers, e-mail servers, terminal servers, and/or the like. The primary servers 106 and the secondary servers 108 may be implemented using any type of computer systems capable of hosting resources for the clients $104_1$-$104_n$.

The primary servers 106, the secondary servers 108, and the storage volumes $114_1$-$114_n$ are coupled to the network 112. The network 112 may comprise, for example, a storage area network (SAN). The storage volumes $114_1$-$114_n$ may comprise any type of block-based storage areas and may be implemented using any type of storage system or storage systems, such as a disk drive system. A disk drive system may include, for example, one or more storage disks, e.g., an array of storage disks or redundant array of storage disks. The storage volumes $114_1$-$114_n$ store data, such as application programs and program data created and managed by the primary servers 106 and the secondary servers 108. The source data is organized into file systems. A file system refers to the structure and arrangement of files in a storage device. For example, a file system typically includes a hierarchy of directories, each of which may contain one or more files.

Figure 2:
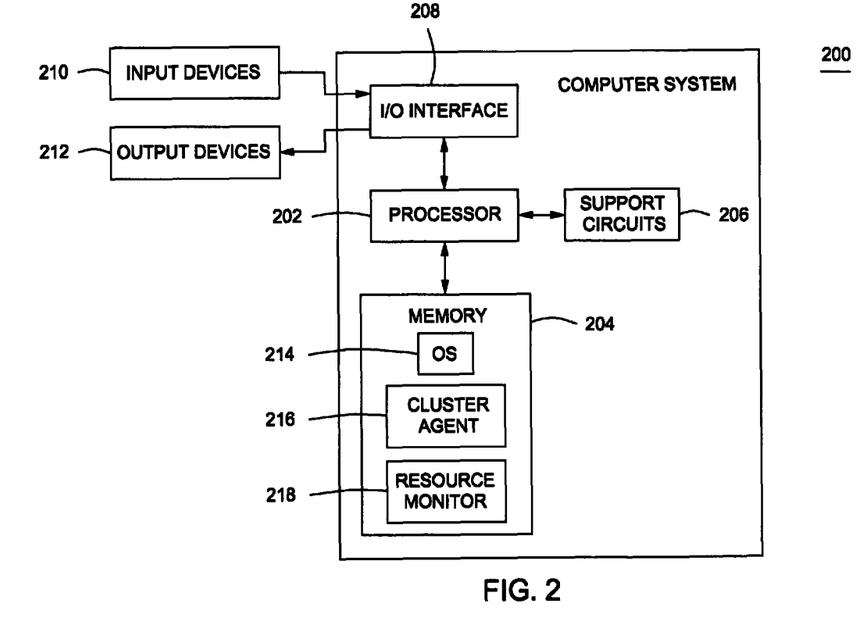
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement one or more of the primary servers 106 and/or secondary servers 108 (shown in FIG. 1). The computer system 200 includes a processor 202, a memory 204, various support circuits 206, and an I/O interface 208. The processor 202 may include one or more microprocessors known in the art. The support circuits 206 for the processor 202 include conventional cache, power supplies, clock circuits, data registers, I/O interfaces 208, and the like. The I/O interface 208 may be directly coupled to the memory 204 or coupled through the processor 202. The I/O interface 208 may also be configured for communication with input devices 210 and/or output devices 212, such as, network devices, various storage devices, mouse, keyboard, display, and the like.

The memory 204 stores processor-executable instructions and/or data that may be executed by and/or used by the processor 202. These processor-executable instructions may comprise hardware, firmware, software, and the like, or some combination thereof. Modules having processor-executable instructions that are stored in the memory 204 may include cluster agent 216 and resource monitor 218. As described below, the cluster agent 216 interacts with the resource monitor 218 to monitor one or more process resources executing on the computer 200. The computer system 200 may be programmed with one or more operating systems (generally referred to as operating system (OS) 214), which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 214 may be disposed in the memory 204. The memory 204 may include one or more of the following random access memory, read only memory, magneto-resistive read/write memory, optical read/write memory, cache memory, magnetic read/write memory, and the like, as well as signal-bearing media as described below.

Figure 3:
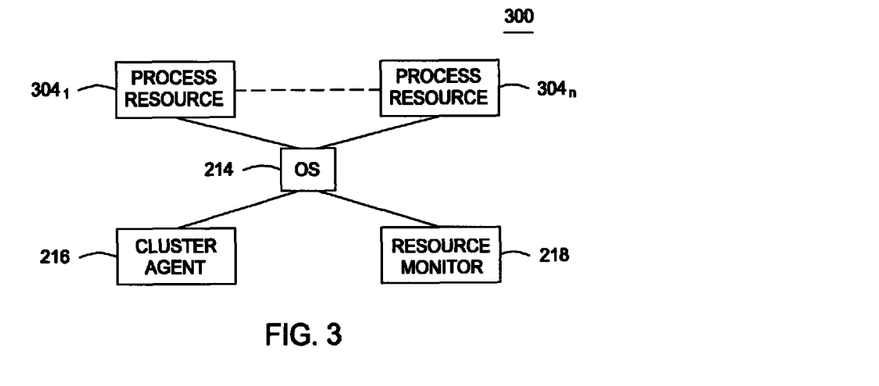
FIG. 3 is a block diagram depicting an exemplary embodiment of a system for monitoring processes in accordance with one or more aspects of the invention.

FIG. 3 is a block diagram depicting an exemplary embodiment of a system 300 for monitoring processes in accordance with one or more aspects of the invention. The system 300 includes the operating system 214, the cluster agent 216, and the resource monitor 218. The operating system 214 is configured to manage various resources, including process resources $304_1$-$304_n$. A process resource includes any process, thread, application, or the like executing on the processor 202. The cluster agent 216 is part of clustering software that manages the server cluster 105. The cluster agent 216 is configured to control failover of resources from one or more computers in the cluster to the computer system 200, or from the computer 200 to one or more other computers in the cluster. In particular, the cluster agent 216 is configured to monitor one or more of the process resources $304_1$-$304_n$ executing on the computer 200 (referred to as monitored processes or designated processes) and to take action in response to particular events associated therewith. For example, if a monitored process terminates, the cluster agent 216 may perform various actions, such as initiating a failover of the process to another computer, attempt to restart the process on the computer 200, or the like.

The cluster agent 216 interacts with the resource monitor 218 to designate one or more processes to be monitored. The resource monitor 218 is configured to passively monitor the designated processes on behalf of the cluster agent 216. The cluster agent 216 waits for notifications from the resource monitor 218 of events related to the designated processes. For example, the resource monitor 218 may be configured to notify the cluster agent 216 if any of the designated processes have terminated. The cluster agent 216 may then take specific actions, as described above. The resource monitor 218 also provides a mechanism for the cluster agent 216 to un-register a process for event monitoring.

To passively monitor the processes, the resource monitor 218 instructs the operating system 214 to report specific events related to the process resources $304_1$-$304_n$, such as process termination events. The resource monitor 218 then remains passive and waits for notifications from the operating system that the events have occurred. For example, if a process terminates, the operating system 214 reports the termination event to the resource monitor 218. For each reported instance of an event, the resource monitor 218 determines if the event is related to any of the monitored processes. If so, the resource monitor 218 notifies the cluster agent 216 that the event has occurred with respect to a particular monitored process.

In some embodiments, the resource monitor 218 instructs the operating system 214 to report events related to process termination, such as a particular system call related to process termination, involuntary termination by the operating system 214, or the like. The resource monitor 218 designates a procedure to be called in response to each instance of the system call. That is, the resource monitor 218 places a "hook" into the operating system 214 such that when an instance of the system call is received, the operating system 214 calls the designated procedure with information related to the system call instance (e.g., what process generated the system call). The process is not affected by the hook. When a call to the designated procedure is made, a determination is made whether the call is related to any of the monitored processes. In this manner, the resource monitor 218 passively detects termination of the monitored processes. Exemplary embodiments of passive process monitoring are described below.

The passive process monitoring approach provided by aspects of the invention provides several advantages. Passive monitoring provides an efficient mechanism for detecting process-related events without incurring additional system resource overhead due to monitoring agents actively polling for the current state of the processes. Event notifications are available instantaneously, which enables the cluster environment to take immediate action (e.g., failover) instead of waiting until the next polling cycle. Moreover, the passive approach does not require any special handling of processes. Monitoring can be applied to already existing processes that have been started normally. For example, there is no requirement to start up a monitored process via a harness or under a special execution environment in order to enable event detection.

Figure 4:
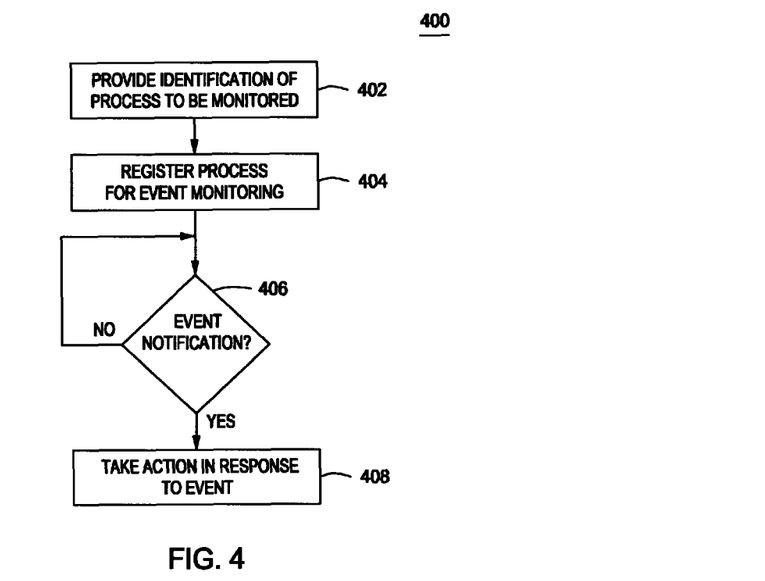
FIG. 4 is a flow diagram depicting an exemplary embodiment of a method for passive monitoring of a process in accordance with one or more aspects of the invention.

FIG. 4 is a flow diagram depicting an exemplary embodiment of a method 400 designating a process to be monitored in accordance with one or more aspects of the invention. The method 400 begins at step 402, where the cluster agent 216 provides process identification information for the process to the resource monitor 218. At step 404, the resource monitor 218 registers the process for event monitoring. In one embodiment, termination events are monitored. Exemplary embodiments of registering a process for event monitoring are described below. At step 406, the cluster agent 216 waits for notification of events related to the process from the resource monitor 218. If an event occurs, the method 400 proceeds to step 408, where the cluster agent 216 takes action relating to the event. For example, if the event indicates that the process has terminated, the cluster agent 216 may attempt to restart the process or initiate a failover of the process to another computer system.

Figure 5:
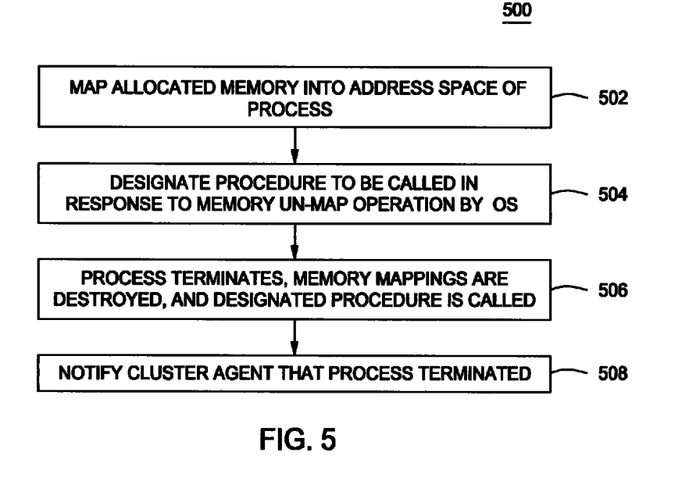
FIG. 5 is a flow diagram depicting another exemplary embodiment of a method for passive monitoring of a process in accordance with one or more aspects of the invention.

FIG. 5 is a flow diagram depicting an exemplary embodiment of a method 500 for passive monitoring of a process in accordance with one or more aspects of the invention. The method 500 begins at step 502, where the resource monitor 218 maps allocated memory into the address space of the process. In one embodiment, the resource monitor 218 uses an identifier for the process obtained from the cluster agent 216 to obtain process information. The process information includes the address space information. The resource monitor 218 may call a memory mapping operation provided by the operating system 214 to map memory allocated by the resource monitor 218 into the address space of the process. For example, in a SOLARIS operating system, the devmap (9F) framework may be employed. It is to be understood that other memory mapping frameworks may be used that are part of other operating systems. The mapping of allocated memory into the address space of the process is involuntary with respect to the process and requires no action from the process. Depending on the layout of the process address space, the mapping can be located in an out-of-the-way location, such as below the process's text section, so as to minimize any effects of the mapping on the process.

At step 504, the resource monitor 218 designates a procedure to be called in response to each instance of a memory un-map operation by the operating system 214. In one embodiment, the procedure is a callback function. When an instance of the memory un-map operation is made, the operating system 214 calls the callback function. The designated procedure is the "hook" that is used to catch the potential termination of the process. At step 506, the process terminates and destroys mappings that are associated with its address space. In doing so, the mapping provided by the resource monitor 218 is also destroyed by calling the memory un-map operation. The designated procedure is called in response to an instance of the memory un-map operation related to the un-mapping of the memory allocated by the resource monitor 218. In this manner, the resource monitor 218 is notified that the process has terminated. Finally, at step 508, the resource monitor 218 notifies the cluster agent 216 of the process termination.

Figure 6:
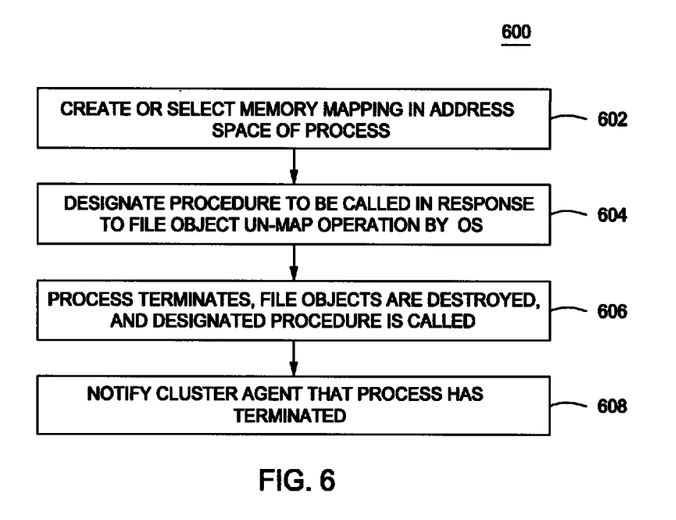
FIG. 6 is a flow diagram depicting yet another exemplary embodiment of a method for passive monitoring of a process in accordance with one or more aspects of the invention.

FIG. 6 is a flow diagram depicting another exemplary embodiment of a method 600 for passive monitoring of a process in accordance with one or more aspects of the invention. The method 600 begins at step 602, where the resource monitor 218 creates or selects a memory mapping in the address space of the process. The resource monitor 218 may obtain the address space of the process from a process identifier obtained from the cluster agent 216. In one embodiment, the resource monitor 218 selects a persistent memory mapping, such as the process text section. Alternatively, the resource monitor 218 may create a memory mapping in a manner similar to that described above with respect to FIG. 5. In either case, the operating system 214 creates a file system object that represents the memory mapping. For example, the file system object may be a vnode.

At step 604, the resource monitor 218 designates a procedure to be called in response to each instance of a file system object un-map operation by the operating system 214. In one embodiment, the designated procedure replaces an un-map procedure in the operating system 214 for the file system object (e.g., a vnode un-map operation). This replacement of the file object un-map operation is the "hook" that is used to catch the potential termination of the process. At step 606, the process terminates and destroys file objects that are associated with its address space. In doing so, the file object associated with the mapping provided by the resource monitor 218 is also destroyed by calling the file object un-map operation. The designated procedure is called in response to an instance of the file object un-map operation related to the un-mapping of the file object associated with the mapping provided by the resource monitor 218. In this manner, the resource monitor 218 is notified that the process has terminated. In one embodiment, the designated procedure calls the file object un-map procedure to perform any action needed by the underlying file system layer.

At step 608, the resource monitor 218 notifies the cluster agent 216 of the process termination. The resource monitor 218 may also perform the administrative task of keeping a reference count of monitored processes sharing the same set of file object operations. When there are no more monitored processes that reference the same set of file object operations, the original file object un-map operation replaces the designated procedure.

Figure 7:
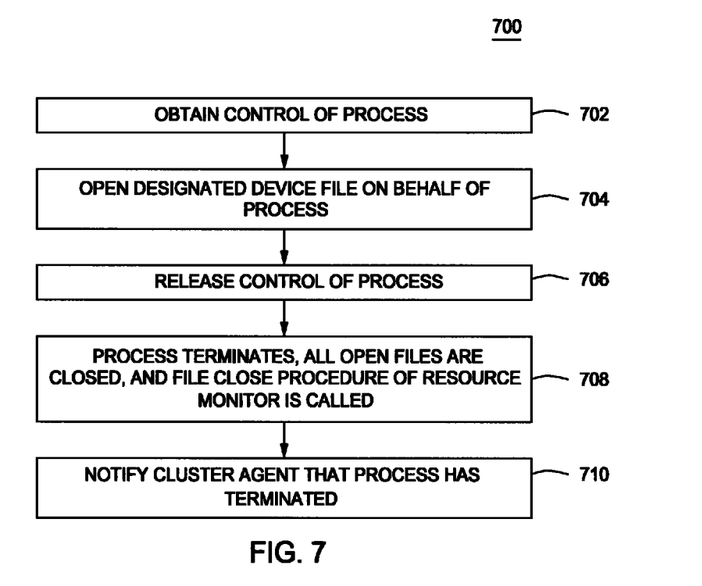
FIG. 7 is a flow diagram depicting yet another exemplary embodiment of a method for passive monitoring of a process in accordance with one or more aspects of the invention.

FIG. 7 is a flow diagram depicting yet another exemplary embodiment of a method 700 for passive monitoring of a process in accordance with one or more aspects of the invention. The method 700 begins at step 702, where the resource monitor 218 obtains control of the process. In one embodiment, control of the process is obtained by opening a control file associated with the process. For example, some operating systems include a /proc file system having process control files that can be used to issue directives to change or otherwise control process behavior. The resource monitor 218 may identify the control file for the process from a process identifier obtained from the cluster agent 216. At step 704, the resource monitor 218 opens a designated device file on behalf of the process. For example, the resource monitor 218 may perform an open file system call (operation) on behalf of the process to open a device file associated with the resource monitor 218. This adds the designated device file to the list of open files maintained for the process. This open file procedure is involuntary with respect to the process and requires no action by the process.

At step 706, the resource monitor 218 releases control of the process. At step 708, the process terminations and all open files associated therewith are closed. A file close procedure of the resource monitor 218 is called related to the closing of the designated device file. In this manner, the resource monitor 218 is notified of the process termination. At step 710, the resource monitor 218 notifies the cluster agent 216 of the process termination. When un-registering a process (stopping process monitoring), the resource monitor 218 may take control of the process in the manner described above and issue directives to close the designated device file on behalf of the process, which removes the designated file from the process's list of open files.

Figure 8:
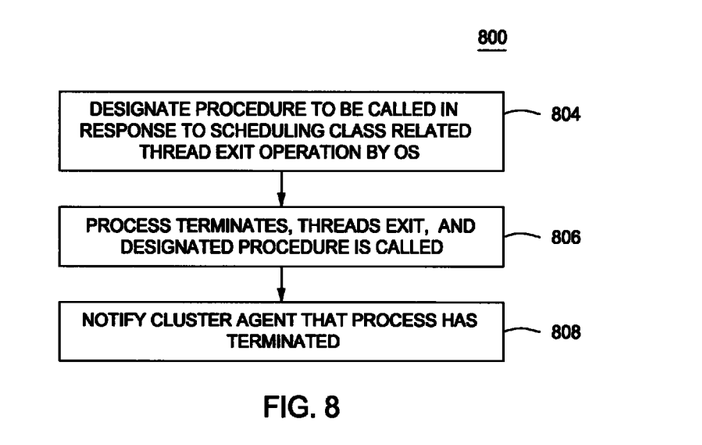
FIG. 8 is a flow diagram depicting yet another exemplary embodiment of a method for passive monitoring of a process via in accordance with one or more aspects of the invention.

FIG. 8 is a flow diagram depicting yet another exemplary embodiment of a method 800 for passive monitoring of a process in accordance with one or more aspects of the invention. Some operating systems may provide scheduling classes associated with threads. The scheduling classes include a set of operations that can be performed with respect to threads. One such specific operation is one that allows the scheduling class to handle matters related to an exiting thread ("scheduling class related thread exit operation"). The method 800 begins at step 802, where the resource monitor 218 designates a procedure to be called in response to each instance of a scheduling class related thread exit operation. In one embodiment, the resource monitor 218 replaces the scheduling class related thread exit operation with the designated procedure. The designated procedure is thus used as the scheduling class related thread exit procedure for all threads.

At step 804, the process terminates and a thread in the process calls the scheduling class related thread exit operation. The designated procedure is thus called in response to an instance of the scheduling class related thread exit operation related to termination of the thread in the process. In this manner, the resource monitor 218 is notified that the process has terminated. In one embodiment, the designated procedure calls the scheduling class related thread exit operation to perform any action needed by the underlying scheduling classes. At step 806, the resource monitor 218 notifies the cluster agent 216 of the process termination. When there is no longer a need to monitor processes, the resource monitor 218 may replace the designated procedure with the original scheduling class related thread exit operation.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method of monitoring a process executing on a computer system comprising:
   receiving an identifier for the process;
   obtaining information about an address space of the process using at least the identifier;
   instructing an operating system to report at least one event related to termination of the process by mapping allocated memory into the address space of the process and designating a procedure to be called in response to each instance of a memory un-map operation called on the allocated memory during the termination of the process;
   detecting the termination of the process in response to the procedure called in response to the memory un-map operation performed during the termination of the process; and
   providing a notification to an agent in the computer system that the process has terminated.

2. The method of claim 1, wherein the at least one event comprises another operation, wherein the step of instructing further comprises designating another procedure to be called in response to each instance of the other operation, and wherein the step of detecting further comprises receiving a notification of a call to the other procedure in response to an instance of the other operation related to the process.

3. The method of claim 1, wherein the step of detecting further comprises:
   receiving a notification of a call to the procedure in response to an instance of the memory un-map operation related to un-mapping of the allocated memory;
   generating the notification in response to the notification of the call.

4. The method of claim 1, wherein the at least one event further comprises a file system object un-map operation, and wherein the step of instructing further comprises:
   creating or selecting a memory mapping in an address space of the process, the memory mapping being associated with a file system object; and
   designating another procedure to be called in response to each instance of the file system object un-map operation.

5. The method of claim 4, wherein the step of detecting comprises:
   receiving a notification of a call to the other procedure in response to an instance of the file system object un-map operation related to un-mapping of the file system object;
   generating the notification in response to the notification of the call.

6. The method of claim 1, wherein the at least one event further comprises a thread exit operation, and wherein the step of instructing further comprises:
   designating another procedure to be called in response to each instance of the thread exit operation.

7. The method of claim 6, wherein the step of detecting comprises:
   receiving a notification of a call to the other procedure in response to an instance of the thread exit operation related to termination the process; and
   generating the notification in response to the notification of the call.

8. The method of claim 1, wherein the at least one event further comprises a file close operation, and wherein the step of instructing further comprises:
   opening a control file associated with the process to take control of the process; and
   opening a designated device file on behalf of the process.

9. The method of claim 8, wherein the step of detecting comprises:
   receiving a notification of a call indicating an instance of the file close operation related to closing of the designated device file; and
   generating the notification in response to the notification of the call.

10. An apparatus for monitoring a process executing on a computer system comprising:
    at least one processor; and
    at least one memory storing instructions to be executed by the at least one processor and thereby cause the at least one processor to:
      receive an identifier for the process;
      obtain information about an address space of the process using at least the identifier;
      instruct an operating system to report at least one event related to termination of the process by mapping allocated memory into the address space of the process and designating a procedure to be called in response to each instance of a memory un-map operation called on the allocated memory during the termination of the process;

detect the termination of the process in response to the procedure called in response to the memory un-map operation performed during the termination of the process; and provide a notification to an agent in the computer system that the process has terminated.

11. The apparatus of claim 10, wherein the at least one event comprises another operation, wherein instructing further comprises designating another procedure to be called in response to each instance of the other operation, and wherein detecting further comprises receiving a notification of a call to the other procedure in response to an instance of the other operation related to the process.

12. The apparatus of claim 10, wherein detecting further comprises:

receiving a notification of a call to the procedure in response to an instance of the memory un-map operation related to un-mapping of the allocated memory; and generating the notification in response to the notification of the call.

13. The apparatus of claim 10, wherein the at least one event further comprises a file system object un-map operation, wherein instructing further comprises:

creating or selecting a memory mapping in an address space of the process, the memory mapping being associated with a file system object; and designating another procedure to be called in response to each instance of the file system object un-map operation; and wherein detecting further comprises:

receiving a notification of a call to the other procedure in response to an instance of the file system object un-map operation related to un-mapping of the file system object; and generating the notification in response to the notification of the call.

14. The apparatus of claim 10, wherein the at least one event further comprises a thread exit operation, wherein instructing further comprises:

designating another procedure to be called in response to each instance of the thread exit operation; and wherein detecting further comprises:

receiving a notification of a call to the other procedure in response to an instance of the thread exit operation related to termination of the process; and generating the notification in response to the notification of the call.

15. The apparatus of claim 10, wherein the at least one event further comprises a file close operation, wherein instructing further comprises:

opening a control file associated with the process to take control of the process; and opening a designated device file on behalf of the process; and wherein detecting further comprises:

receiving a notification of a call indicating an instance of the file close operation related to closing of the designated device file; and generating the notification in response to the notification of the call.

16. A system for monitoring a process executing on an operating system comprising:

at least one processor; and at least one memory storing instructions to be executed by the at least one processor and thereby cause the at least one processor to:

obtaining information about an address space of the process using at least one identifier for the process;

perform at least one action in response to termination of the process;

instruct the operating system to report at least one event related to termination of the process by mapping allocated memory into the address space of the process and designating a procedure to be called in response to each instance of a memory un-map operation called on the allocated memory during the termination of the process;

detect the termination of the process in response to the procedure called in response to the memory un-map operation performed during the termination of the process; and provide a notification to the agent that the process has terminated.

17. The system of claim 16, wherein the at least one event further comprises another operation, and wherein instructing further comprises designating another procedure to be called in response to each instance of the other operation and receive a notification of a call to the other procedure in response to an instance of the other operation related to the process.

18. The system of claim 17, wherein the operation further comprises one of a file system object un-map operation, a thread exit operation, and a file close operation.

19. The system of claim 16, wherein the at least one action comprises at least one of restarting the process or failing over the process.

* * * * *